United States Patent
Kall et al.

(10) Patent No.: US 11,019,486 B2
(45) Date of Patent: May 25, 2021

(54) LOCATION INFORMATION FOR UNTRUSTED ACCESS

(71) Applicant: NOKIA SOLUTIONS AND NETWORKS OY, Espoo (FI)

(72) Inventors: Anders Jan Olof Kall, Espoo (FI); Gyorgy Tamas Wolfner, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/526,906

(22) PCT Filed: Nov. 14, 2014

(86) PCT No.: PCT/EP2014/074665
§ 371 (c)(1),
(2) Date: May 15, 2017

(87) PCT Pub. No.: WO2016/074748
PCT Pub. Date: May 19, 2016

(65) Prior Publication Data
US 2017/0318414 A1   Nov. 2, 2017

(51) Int. Cl.
*H04W 12/02* (2009.01)
*H04W 12/06* (2021.01)
(Continued)

(52) U.S. Cl.
CPC .............. *H04W 12/02* (2013.01); *H04W 8/16* (2013.01); *H04W 12/06* (2013.01);
(Continued)

(58) Field of Classification Search
CPC ....... H04W 12/06; H04W 4/02; H04W 64/00; H04W 88/16; H04W 8/12; H04W 76/12;
(Continued)

(56) References Cited

U.S. PATENT DOCUMENTS

2006/0245406 A1\* 11/2006 Shim ................... H04L 63/0272
370/338
2009/0059829 A1   3/2009 Bachmann et al.
(Continued)

FOREIGN PATENT DOCUMENTS

| EP | 2 571 327 A1 | 3/2013 |
| EP | 2 763 357 A1 | 8/2014 |

(Continued)

OTHER PUBLICATIONS

International Search Report & Written Opinion dated Sep. 22, 2015 corresponding to International Patent Application No. PCT/EP2014/074665.

(Continued)

*Primary Examiner* — Allahyar Kasraian
(74) *Attorney, Agent, or Firm* — Squire Patton Boggs (US) LLP

(57) ABSTRACT

It is provided a method, comprising monitoring if a tunnel to a terminal via an untrusted network is to be established, wherein the tunnel is set up only if the terminal is authenticated and authorized; requesting, if the tunnel is to be established, the authentication and authorization and an information on a location of the terminal; providing the information on the location received in response to the request to a gateway.

7 Claims, 3 Drawing Sheets

(51) Int. Cl.
*H04W 12/084* (2021.01)
*H04W 8/16* (2009.01)
*H04W 84/04* (2009.01)
*H04W 84/12* (2009.01)

(52) U.S. Cl.
CPC ........ *H04W 12/084* (2021.01); *H04W 84/042* (2013.01); *H04W 84/12* (2013.01)

(58) Field of Classification Search
CPC .... H04W 92/02; H04W 8/08; H04L 63/0892; H04L 67/18; H04L 63/08; H04L 61/609; H04L 65/1073
USPC ................................ 455/410, 411, 456.1–457
See application file for complete search history.

(56) References Cited

U.S. PATENT DOCUMENTS

| | | | | |
|---|---|---|---|---|
| 2010/0205435 | A1* | 8/2010 | Xie | H04L 9/32 713/168 |
| 2012/0195414 | A1* | 8/2012 | Yang | H04L 65/1016 379/93.14 |
| 2012/0202518 | A1* | 8/2012 | Lim | H04W 64/00 455/456.1 |
| 2015/0324880 | A1* | 11/2015 | Huang | G06Q 20/204 705/26.35 |
| 2016/0057728 | A1* | 2/2016 | Dhammawat | H04W 4/021 455/456.6 |

FOREIGN PATENT DOCUMENTS

| | | |
|---|---|---|
| JP | 2010-161638 A | 7/2010 |
| JP | 2011-509615 A | 3/2011 |
| JP | 2013-240090 A | 11/2013 |
| KR | 100806288 B1 * | 2/2008 |
| WO | 2009/087099 A1 | 7/2009 |
| WO | WO 2014/005652 A1 | 1/2014 |
| WO | WO 2014/072569 A1 | 5/2014 |

OTHER PUBLICATIONS

3GPP TS 23.402 V12.6.0 (Sep. 2014), Technical Specification, 3rd Generation Partnership Project; Technical Specification Group Services and System Aspects; Architecture enhancements for non-3GPP accesses (Release 12), Sep. 2014, 288 pages.
"Universal Mobile Telecommunications System (UMTS); LTE; Evolved Packet System (EPS); 3GPP EPS AAA Interfaces (3GPP TS 29.273 version 12.5.0 Release 12)," Technical Specification, European Telecommunications Standards Institute (ETSI), ETSI TS 129 273 V12.5.0 (Oct. 2014), pp. 1-159, XP014223903.
H. Tschofenig et al.: "Carrying Location Objects in RADIUS and Diameter," Internet Engineering Task Force, IETF, Network Working Group, RFC 5580, Aug. 2009, pp. 1-53, XP015065634.
ZTE: "Discussion for the Lobster solutions," 3GPP Draft; S2-112314, SA WG2 Meeting #85, May 16-20, 2011, Xi'An, P.R. China, May 16-20, 2011, pp. 1-5, XP050525337.
P. Calhoun et al., "Diameter Base Protocol," Network Working Group, RFC 3588, pp. 1-147, Sep. 2003.
Japanese Office Action issued in corresponding Japanese Patent Application No. 2017-526084 dated Jul. 31, 2018.
Chinese Office Action issued in corresponding Chinese Patent Application No. 201480084552.3 dated Sep. 24, 2019.
Chinese Office Action issued in corresponding Chinese Patent Application No. 201480084552.3 dated Jun. 9, 2020.
Chinese Office Action issued in corresponding Chinese Patent Application No. 201480084552.3 dated Nov. 27, 2020.

* cited by examiner

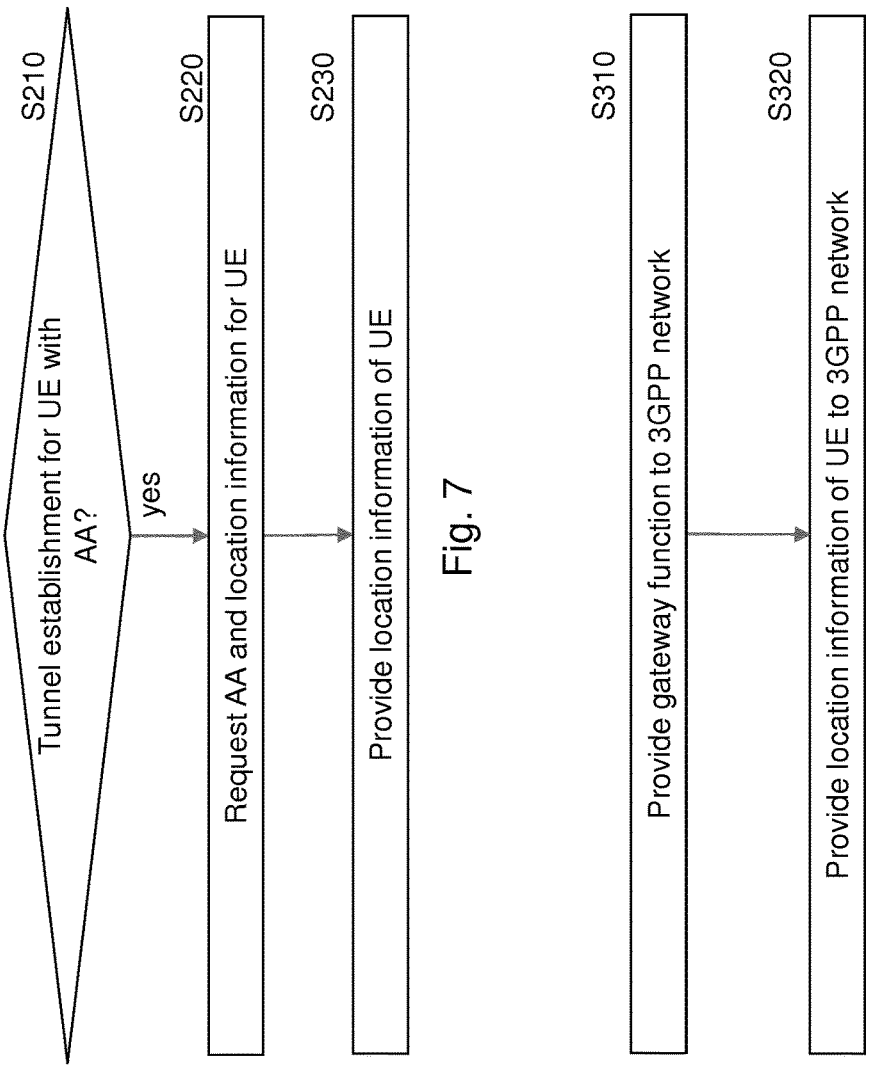
Fig. 7
Fig. 9
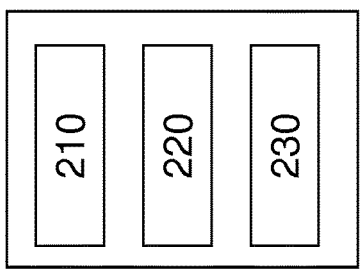
Fig. 6
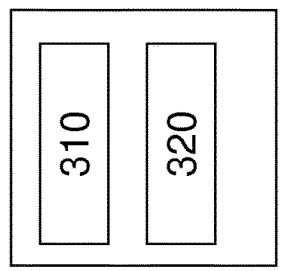
Fig. 8
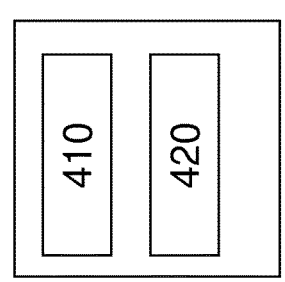
Fig. 10

LOCATION INFORMATION FOR UNTRUSTED ACCESS

FIELD OF THE INVENTION

The present invention relates to an apparatus, a method, and a computer program product related to non-3GPP access. More particularly, the present invention relates to an apparatus, a method, and a computer program product related to location information for non-3GPP access.

BACKGROUND OF THE INVENTION

Abbreviations

3GPP 3rd Generation Partnership Project
AA Authentication, Authorization
AAA Authentication, Authorization, Accounting
AGW Access Network Gateway
AVP Attribute-Value Pair
EDGE Enhanced Datarate for GSM Evolution
EPC Evolved Packet Core
ePDG Evolved PDG
GPRS Generic Packet Radio Service
GSM Global System for Mobile Communication
HPLMN Home PLMN
HSS Home Subscriber Server
IMS IP Multimedia Subsystem
IP Internet Protocol
IPsec IP Security
LAN Local Area Network
LCS Location Services
LTE Long Term Evolution
LTE-A LTE Advanced
OSA Open Service Architecture
PDG Packet Data Gateway
PDN Packet Data Network
PDN-GW PDN-Gateway
PDP Packet Data Protocol
PGW PDN-Gateway
PLMN Public Land Mobile Network
RAT Radio Access Technology
TS Technical Specification
TWAG Trusted WLAN Access Gateway
TWAN Trusted WLAN Access Network
UAGW Untrusted AGW (AGW in an untrusted access network)
UE User Equipment
UMTS Universal Mobile Telecommunications System
UTRAN Universal Terrestrial Radio Access Network
VPLMN Visited PLMN
WiFi Wireless Fidelity, also named WLAN
WLAN Wireless LAN 3GPP specifies two types of WLAN access: trusted and untrusted (see details in 3GPP TS 23.402). Whether a Non-3GPP access network (such as a WLAN network) is trusted or untrusted is not a characteristic of the access network but decided by the respective 3GPP operator. I.e., a non-3GPP network may be trusted for one 3GPP operator and untrusted for another 3GPP operator. There are differences in the signalling between an untrusted access network and the core network and between a trusted access network and the core network respectively. One difference is that a so-called ePDG network entity is only inserted between the untrusted access network and the core network and there is no corresponding network entity between the trusted access network and the core network.

3GPP specifications currently specify how to determine network provided location information for a UE connected to EPC using trusted access, i.e. TWAN.

If a UE accesses a trusted access such as TWAN, which can deliver network provided location information, the TWAG delivers trusted location information to the PGW over the S2a interface in the "TWAN Identifier" information element in GTPv2 signalling and in the "Access Network Identifier" information element in PMIPv6 signalling. TWAG also delivers the UE's location information to the 3GPP AAA Server over the STa interface in the "Access-Network-Info" AVP.

An LCS client (Software and/or hardware entity that requests location information for e.g. one or more UEs), which can be an application server (e.g. SIP Application Server and/or the OSA Service Capability Server) can request the UE's location information from the HSS over the Sh interface. The HSS can then request the location information for a specific UE, i.e. the "Access-Network-Info" AVP, from the 3GPP AAA Server over the SWx interface.

TWAG is the gateway of TWAN interfacing with the PGW over the S2a interface and with the 3GPP AAA Server over the STa interface. UAGW is the gateway of the untrusted access network interfacing with the PGW via eDPG over the S2b interface and with the 3GPP AAA Server over the SWa interface. The relevant interfaces according to 3GPP TS 23.402 are shown in FIG. 1.

The PGW is the user plane anchor for mobility between 3GPP access and (trusted or untrusted) non-3GPP access. In addition, in case of untrusted non-3GPP access, ePDG is responsible for handling the local and remote IP addresses, routing of packets from/to PGW to/from UE; and serves as a tunnel endpoint for the Swu interface to the UE via an IPsec tunnel through the untrusted non-3GPP network.

According to the current 3GPP specifications, the ePDG identifier (or the location of the ePDG) and the access network type (RAT Type) is the only location related information that the network can use to determine some approximation of the UE's location when untrusted WLAN is used to access EPC. There is no method specified how the network can deliver and assure more specific location information for a UE connected to the ePDG using untrusted access. In some cases, the ePDG location may be totally different from the location of the UE if a UE can access the ePDG via the Internet. E.g. it is possible to use an ePDG of the HPLMN from another country.

SUMMARY OF THE INVENTION

It is an object of the present invention to improve the prior art.

According to a first aspect of the invention, there is provided an apparatus, comprising checking means adapted to check if a terminal is authenticated and authorized to access an access network of a type different from a third generation partnership project network type, wherein user information is requested from a server of a network of the third generation partnership project type for the authenticating and authorizing; providing means adapted to provide, if the terminal is authenticated and authorized based on the user information, a location information of the terminal to the server.

The location information may be provided in an access-network-info attribute value pair.

The access network may be not trusted by the network of the third generation partnership project type.

The access network may provide an access via a wireless local area network, and/or the access network may provide a fixed wired access.

According to a second aspect of the invention, there is provided an apparatus, comprising monitoring means adapted to monitor if a gateway requests an authentication and authorization for a terminal and an information on a location of the terminal; providing means adapted to provide, if the request for the information on the location is received, the information on the location to the gateway in response to the request.

The apparatus may further comprise inhibiting means adapted to inhibit the providing means from providing the location information if at least one of the authentication and authorization is not provided to the gateway in response to the request.

The apparatus may be comprised in an authentication, authorization and accounting server of a third generation partnership project network.

According to a third aspect of the invention, there is provided an apparatus, comprising monitoring means adapted to monitor if a tunnel to a terminal via an untrusted (not trusted) network is to be established, wherein the tunnel is set up only if the terminal is authenticated and authorized; requesting means adapted to request, if the tunnel is to be established, the authentication and authorization and an information on a location of the terminal; providing means adapted to provide the information on the location received in response to the request to a gateway.

The apparatus may be comprised in a packet data gateway of a third generation partnership project network.

The untrusted network may be a wireless local area network.

According to a fourth aspect of the invention, there is provided an apparatus, comprising gateway means adapted to provide a gateway function to a third generation partnership project network; providing means adapted to provide a location information of a terminal to the third generation partnership project network, wherein the location information is received from an access network having a network type different from a third generation partnership project network type.

The access network may be untrusted by the third generation partnership project network.

According to a fifth aspect of the invention, there is provided an apparatus, comprising checking circuitry configured to check if a terminal is authenticated and authorized to access an access network of a type different from a third generation partnership project network type, wherein user information is requested from a server of a network of the third generation partnership project type for the authenticating and authorizing; providing circuitry configured to provide, if the terminal is authenticated and authorized based on the user information, a location information of the terminal to the server.

The location information may be provided in an access-network-info attribute value pair.

The access network may be not trusted by the network of the third generation partnership project type.

The access network may provide an access via a wireless local area network, and/or the access network may provide a fixed wired access.

According to a sixth aspect of the invention, there is provided an apparatus, comprising monitoring circuitry configured to monitor if a gateway requests an authentication and authorization for a terminal and an information on a location of the terminal; providing circuitry configured to provide, if the request for the information on the location is received, the information on the location to the gateway in response to the request.

The apparatus may further comprise inhibiting circuitry configured to inhibit the providing circuitry from providing the location information if at least one of the authentication and authorization is not provided to the gateway in response to the request.

The apparatus may be comprised in an authentication, authorization and accounting server of a third generation partnership project network.

According to a seventh aspect of the invention, there is provided an apparatus, comprising monitoring circuitry configured to monitor if a tunnel to a terminal via an untrusted (not trusted) network is to be established, wherein the tunnel is set up only if the terminal is authenticated and authorized; requesting circuitry configured to request, if the tunnel is to be established, the authentication and authorization and an information on a location of the terminal; providing circuitry configured to provide the information on the location received in response to the request to a gateway.

The apparatus may be comprised in a packet data gateway of a third generation partnership project network.

The untrusted network may be a wireless local area network.

According to a eighth aspect of the invention, there is provided an apparatus, comprising gateway circuitry configured to provide a gateway function to a third generation partnership project network; providing circuitry configured to provide a location information of a terminal to the third generation partnership project network, wherein the location information is received from an access network having a network type different from a third generation partnership project network type.

The access network may be untrusted by the third generation partnership project network.

According to a ninth aspect of the invention, there is provided a method, comprising checking if a terminal is authenticated and authorized to access an access network of a type different from a third generation partnership project network type, wherein user information is requested from a server of a network of the third generation partnership project type for the authenticating and authorizing; providing, if the terminal is authenticated and authorized based on the user information, a location information of the terminal to the server.

The location information may be provided in an access-network-info attribute value pair.

The access network may be not trusted (untrusted) by the network of the third generation partnership project type.

The access network may provide an access via a wireless local area network and/or the access network may provide a fixed wired access.

According to a tenth aspect of the invention, there is provided a method, comprising monitoring if a gateway requests an authentication and authorization for a terminal and an information on a location of the terminal; providing, if the request for the information on the location is received, the information on the location to the gateway in response to the request.

The method may further comprise inhibiting the providing means from providing the location information if at least one of the authentication and authorization is not provided to the gateway in response to the request.

The method may be performed in an authentication, authorization and accounting server of a third generation partnership project network.

According to an eleventh aspect of the invention, there is provided a method, comprising monitoring if a tunnel to a terminal via an untrusted network is to be established, wherein the tunnel is set up only if the terminal is authenticated and authorized; requesting, if the tunnel is to be established, the authentication and authorization and an information on a location of the terminal; providing the information on the location received in response to the request to a gateway.

The method may be performed in a packet data gateway of a third generation partnership project network.

The untrusted network may be a wireless local area network.

According to a twelfth aspect of the invention, there is provided a method, comprising providing a gateway function to a third generation partnership project network; providing a location information of a terminal to the third generation partnership project network, wherein the location information is received from an access network having a network type different from a third generation partnership project network type.

The access network may be untrusted by the third generation partnership project network.

Each of the methods of the ninth to twelfth aspects may be a method of providing location information.

According to a thirteenth aspect of the invention, there is provided a computer program product comprising a set of instructions which, when executed on an apparatus, is configured to cause the apparatus to carry out the method according to any one of the ninth to twelfth aspects. The computer program product may be embodied as a computer-readable medium or directly loadable into a computer.

According to some embodiments of the invention, location information is made available in the 3GPP network not only in case the UE is in a trusted non-3GPP network but also if the UE is in a untrusted non-3GPP network.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein

FIG. 6 shows an apparatus according to an embodiment of the invention;

FIG. 7 shows a method according to an embodiment of the invention;

FIG. 8 shows an apparatus according to an embodiment of the invention;

FIG. 9 shows a method according to an embodiment of the invention; and

FIG. 10 shows an apparatus according to an embodiment of the invention.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

So far it has not been possible for the AGW in the untrusted network (UAGW) to deliver location information to the PGW and it has not been possible for the UAGW to deliver location information the 3GPP AAA Server either. Namely, it has not been described or specified how the 3GPP network can determine and assure the location of a UE that is connected to EPC over an untrusted access via ePDG more specifically than by location of ePDG and RAT type. There is a need arising to deliver such network assured location information to PGW and/or AAA server and/or HSS, e.g. due to plans to provide IMS services over untrusted non-3GPP networks.

In particular, if LCS client requests location information from HSS, it does not distinguish if the UE is connected over a trusted access or over an untrusted access. According to some embodiments the invention, LCS client and the HSS can get trustworthy location information from the 3GPP AAA Server also for a UE that is attached to an untrusted access network. Previously this was only possibly for a UE that is attached to a trusted access network like TWAN.

According to some embodiments of the invention, the ePDG provides more specific information about the UE location if such information is available.

According to some embodiments of the invention, a solution to deliver network provided location information corresponding to that for the UE accessing a trusted access such as TWAN is provided. Namely, according to some embodiments of the invention, the ePDG provides location information to the PGW when this information is available in a reliable manner in a similar way as a TWAG provides the location information of the UE. Moreover when this information is available in a reliable manner in the ePDG and not available in the 3GPP AAA server then the ePDG provides location information to the 3GPP AAA server in a similar way as a TWAG provides the location information of the UE. Some embodiments of the invention also apply in roaming scenarios where the untrusted access network is connected to the AAA Server in the HPLMN via a Proxy AAA Server in the VPLMN over the SWd interface.

According to some embodiments of the invention, there are two scenarios A and B when the location of the UE may be made available in the ePDG.

Figure 1:
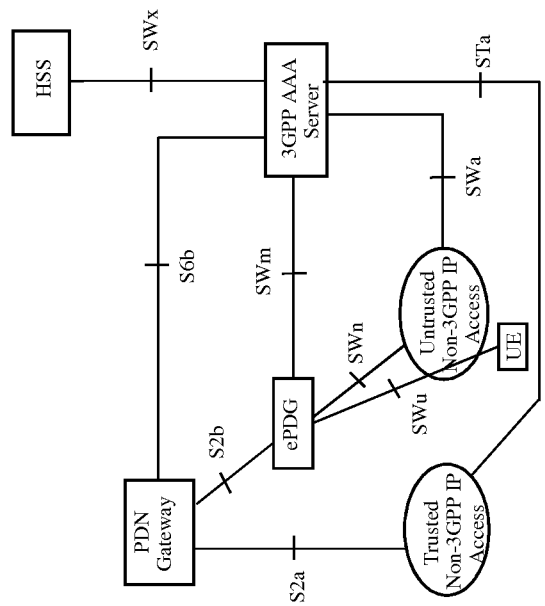
FIG. 1 shows 3GPP specified interfaces according to 3GPP TS 23.402.

According to scenario A, the location is made available when the 3GPP based access network authentication is performed. According to existing 3GPP specifications the UE is authenticated and authorized in two steps: first for using the untrusted access network and then for accessing the EPC by establishing an IPsec tunnel between the UE and ePDG (SWu interface of FIG. 1).

According to some embodiments of the invention, the untrusted Access Network (more specifically: the UAGW) sends the UE's location information to the 3GPP AAA Server over the SWa interface during the access network authentication. That is, when the untrusted access network requests authentication and authorization from the AAA server of the 3GPP network, the untrusted access network provides additionally the UE's location information to the AAA server. The AVP "Access-Network-Info" that is already defined for the STa interface can be reused for the SWa interface, at least for WLAN access networks.

Then, according to scenario A, the AAA Server of the 3GPP network sends the location information to the ePDG via the SWm interface when the UE performs the IPsec tunnel establishment with the ePDG. That is, when the ePDG requests authentication and authorization from the AAA server for setting up the IPsec tunnel, it also requests the location from the AAA server, which is provided in response to the request. The request may be explicit or implicit. In the latter case, the request for authentication and authorization is interpreted as request for the location, too. It is a new aspect of some embodiments of this invention that the 3GPP AAA Server sends the location information to the ePDG in the authorization response message it sends to the ePDG. In contrast to that, the 3GPP AAA Server does not send any location information in the authorization response message it sends e.g. to TWAG.

More specifically, according to some embodiments of the invention based on 3GPP TS 29.273, clause 7, the AAA Server receives e.g. Authentication and Authorization Request from the ePDG, see Table 7.1.2.1.1/1 by a Diameter message. The source of Diameter messages are always included in the Diameter message, see RFC 3588, 6.1.1 Originating a Request: " . . . the Origin-Host and Origin-Realm AVPs MUST be set to the appropriate values, used to identify the source of the message." Hence, AAA server is informed that the Authentication and Authorization request is from ePDG.

On the other hand, HSS does not send any authentication/authorization REQUEST to the AAA server, but the HSS sends the different message "User Profile Update Request" to the AAA Server, see 3GPP TS 29.273, Table 8.1.2.3.1/1. Again, the AAA Server knows on which interface it has received the request, i.e. from HSS on the SWx interface and from the PGW on the S6b interface. The contents of the messages are different as shown in the tables Table 7.1.2.1.1/1 versus Table 8.1.2.3.1/1 of 3GPP TS 29.273, respectively.

To get reliable location information according to the solutions described in this disclosure, an agreement between at least one of the HPLMN operator and the VPLMN operator on one side and the operator of the untrusted network and ePDG on the other side should cover and ensure that the location information delivered by the untrusted network and ePDG is trustworthy. If the agreement is closed by the VPLMN operator but not by the HPLMN operator, the HPLMN operator may trust location information delivered to the HPLMN's AAA Server via the Proxy AAA server of the VPLMN, if this is covered by the (separate) roaming agreement between the HPLMN and VPLMN.

Based on such agreement the ePDG and hence the EPC can trust the given location information, after the 3GPP AAA server has authenticated and authorized the UE to use the untrusted access network.

The other scenario (scenario B) according to some embodiments of the invention is when the ePDG functionality is deployed within the untrusted access network (e.g. integrated with the Access GW), or the ePDG knows the deployment of the untrusted access network (e.g. the untrusted access network is connected to the ePDG via a dedicated physical or logical interface). In this case, ePDG learns and can trust the UE's location information in a proprietary manner. E.g. based on the deployment (e.g. used subnet), the ePDG knows the access network where the UE is, or there is proprietary interface between the ePDG and the access GW. In this scenario B the ePDG sends the UE's location information to the 3GPP AAA server over the SWm interface in a similar way as TWAG sends location information to the 3GPP AAA Server over the STa interface.

ePDG may also send the UE's location information to the PGW over S2b interface in a similar way as TWAG sends the location information to the PGW over the S2a interface. In some embodiments of the invention, the definition of the Access-Network-Info AVP over SWa and the information elements for location information over S2b are expanded to include location information related to other types of accesses than WLAN, since ePDG can be used to connect many types of Untrusted access networks to EPC.

Figure 3:
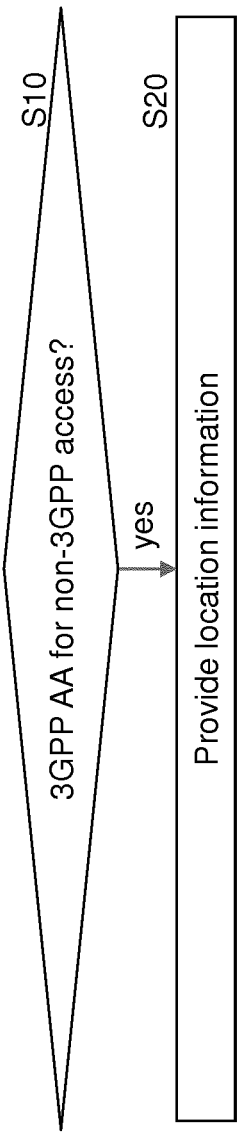
FIG. 3 shows a method according to an embodiment of the invention.
Figure 2:
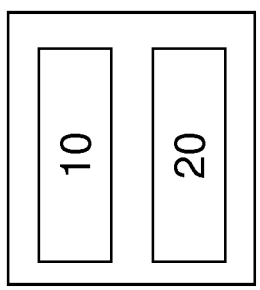
FIG. 2 shows an apparatus according to an embodiment of the invention.

FIG. 2 shows an apparatus according to an embodiment of the invention. The apparatus may be a gateway to a 3GPP network or an element thereof. FIG. 3 shows a method according to an embodiment of the invention. The apparatus according to FIG. 2 may perform the method of FIG. 3 but is not limited to this method. The method of FIG. 3 may be performed by the apparatus of FIG. 2 but is not limited to being performed by this apparatus.

The apparatus comprises checking means 10 and providing means 20.

The checking means 10 checks if a terminal is authenticated and authorized to access an access network of a type different from a third generation partnership project network type (S10). I.e. the terminal wants to access a non-3GPP network. For the authentication and authorization of the terminal, user information is requested from a server of a network of the third generation partnership project type (i.e. from a 3GPP network).

If the terminal is authenticated and authorized based on the user information ("yes" in S10), the providing means 20 provides a location information of the terminal to the server (S20).

Figure 5:
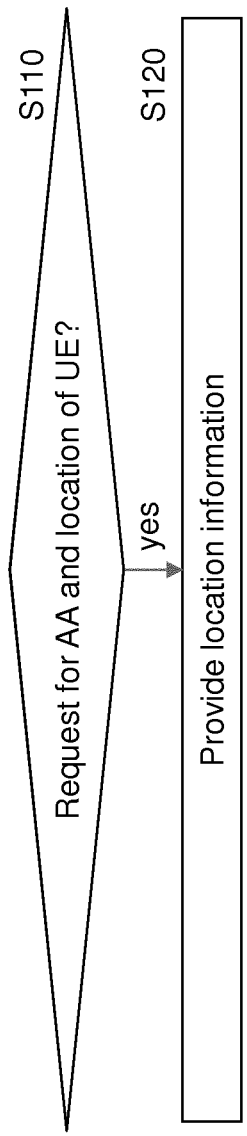
FIG. 5 shows a method according to an embodiment of the invention.
Figure 4:
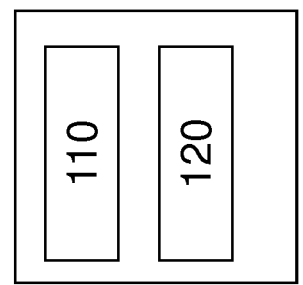
FIG. 4 shows an apparatus according to an embodiment of the invention.

FIG. 4 shows an apparatus according to an embodiment of the invention. The apparatus may be an AA server such as an AAA server of a 3GPP network or an element thereof. FIG. 5 shows a method according to an embodiment of the invention. The apparatus according to FIG. 4 may perform the method of FIG. 5 but is not limited to this method. The method of FIG. 5 may be performed by the apparatus of FIG. 4 but is not limited to being performed by this apparatus.

The apparatus comprises monitoring means 110 and providing means 120.

The monitoring means 110 monitors if a gateway requests an authentication and authorization for a terminal and an information on a location of the terminal (S110). The gateway may be e.g. a PDG or an ePDG. The request for the location may be explicit or implicit.

If the request for the information on the location is received ("yes" in S110), the providing means 120 to provides the information on the location to the gateway in response to the request (S120).

FIG. 6 shows an apparatus according to an embodiment of the invention. The apparatus may be a gateway such as a PDG or ePDG or an element thereof. FIG. 7 shows a method according to an embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises monitoring means 210, requesting means 220, and providing means 230.

The monitoring means 210 monitors if a tunnel to a terminal via an untrusted network is to be established (S210). The tunnel is set up only if the terminal is authenticated and authorized. Authentication and authorization may have to be performed by a 3GPP network.

If the tunnel is to be established (S210="yes"), the requesting means 220 requests the authentication and authorization and an information on a location of the terminal (S220). The request for the location may be explicit or implicit. The request may be directed to a 3GPP network, in particular to an AA server or an AAA server of the 3GPP network.

The providing means 230 provides the information on the location to a gateway device (S230). The information is received in response to the request of S220. The gateway device may be a PGW such as a PGW of a 3GPP network.

FIG. 8 shows an apparatus according to an embodiment of the invention. The apparatus may be a gateway such as a PDG or ePDG or an element thereof. The apparatus may be integrated in network which is untrusted by a 3GPP network to which the apparatus provides an interface. FIG. 9 shows a method according to an embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises gateway means 310 and providing means 320.

The gateway means 310 provides a gateway function to a third generation partnership project network (S310). E.g., it may provide a ePDG function to the 3GPP network.

The providing means 320 provides a location information of a terminal to the third generation partnership project network (S320). The location information is received from an access network having a type different from a third generation partnership project type (i.e. from a non-3GPP network).

FIG. 10 shows an apparatus according to an embodiment of the invention. The apparatus comprises at least one processor 410, at least one memory 420 including computer program code, and the at least one processor 410, with the at least one memory 420 and the computer program code, being arranged to cause the apparatus to at least perform at least one of the methods according to FIGS. 3, 5, 7, and 9.

Embodiments of the invention may be employed in a LTE-A network as 3GPP network. They may be employed also in other mobile networks such as CDMA, EDGE, LTE, UTRAN networks, etc. The non-3GPP network may be a WiFi, WLAN network, fixed broadband access or a network of another access technology or any combination thereof, e.g. WLAN connected via fixed broadband access.

A terminal may be a user equipment such as a mobile phone, a smart phone, a PDA, a laptop, a tablet PC, a wearable, a machine-to-machine device, or any other device which may be connected to the respective 3GPP network and non-3GPP network.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

According to the above description, it should thus be apparent that exemplary embodiments of the present invention provide, for example a gateway such as a PGW, a ePDG, or a wireless access gateway, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that exemplary embodiments of the present invention provide, for example an AAA server, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
   at least one processor; and
   at least one memory including computer program code,
   wherein the at least one memory and computer program code are configured to, with the at least one processor, cause the apparatus at least to:
   receive, from an untrusted access network, an information on a location of a terminal during access network authentication;
   monitor a gateway requesting an authentication and authorization for the terminal for establishing an Internet Protocol Security (IPsec) tunnel between the terminal and the gateway, and the information on the location of the terminal; and
   provide, in response to the request for the information on the location of the terminal is received, the information on the location of the terminal to the gateway in response to the request.

2. The apparatus according to claim 1, wherein the at least one memory and computer program code are further configured to, with the at least one processor, cause the apparatus at least to inhibit providing the location information based on determination of at least one of the authentication and authorization is not provided to the gateway in response to the request.

3. The apparatus according to claim 1, comprised in an authentication, authorization and accounting server of a third generation partnership project network.

4. A method, comprising:
receiving, from an untrusted access network, an information on a location of a terminal during access network authentication;
monitoring a gateway requesting an authentication and authorization for the terminal for establishing an Internet Protocol Security (IPsec) tunnel between the terminal and the gateway, and the information on the location of the terminal; and
providing, in response to the request for the information on the location of the terminal is received, the information on the location of the terminal to the gateway in response to the request.

5. A computer program product embodied on a non-transitory computer-readable medium, said computer program product comprising a set of instructions which, when executed on an apparatus, is configured to cause the apparatus to carry out the method according to claim 4.

6. The method according to claim 4, further comprising inhibiting the providing means from providing the location information based on determination of at least one of the authentication and authorization is not provided to the gateway in response to the request.

7. The method according to claim 4, performed in an authentication, authorization and accounting server of a third generation partnership project network.

* * * * *